United States Patent
Chen et al.

(10) Patent No.: US 7,386,403 B2
(45) Date of Patent: Jun. 10, 2008

(54) METHOD AND SYSTEM FOR CHARGING MANAGEMENT

(75) Inventors: Jyun-Yu Chen, Taipei (TW); Hua-Hung Chen, Taipei (TW)

(73) Assignee: Inventec Corporation, Shih-Lin District, Taipei (TW)

( * ) Notice: Subject to any disclaimer, the term of this patent is extended or adjusted under 35 U.S.C. 154(b) by 0 days.

(21) Appl. No.: 11/096,327

(22) Filed: Mar. 30, 2005

(65) Prior Publication Data

US 2006/0229832 A1 Oct. 12, 2006

(51) Int. Cl.
*G01R 31/36* (2006.01)
*H02J 7/00* (2006.01)
*G06F 1/00* (2006.01)

(52) U.S. Cl. .................. 702/63; 320/137; 713/310

(58) Field of Classification Search .................. 702/63; 320/137; 700/297; 340/636.1; 715/835; 713/300, 310, 320–321, 340
See application file for complete search history.

(56) References Cited

U.S. PATENT DOCUMENTS

| | | | | | |
|---|---|---|---|---|---|
| 5,459,671 | A | * | 10/1995 | Duley | 702/63 |
| 5,606,242 | A | * | 2/1997 | Hull et al. | 320/106 |
| 5,691,742 | A | * | 11/1997 | O'Connor et al. | 715/835 |
| 5,758,172 | A | * | 5/1998 | Seo | 713/300 |
| 5,862,392 | A | * | 1/1999 | Charkey et al. | 713/300 |
| 5,983,073 | A | * | 11/1999 | Ditzik | 455/11.1 |
| 6,025,698 | A | * | 2/2000 | Kim et al. | 320/132 |
| 6,097,175 | A | * | 8/2000 | Yoon | 320/132 |
| 6,181,103 | B1 | * | 1/2001 | Chen | 320/106 |
| 6,252,511 | B1 | * | 6/2001 | Mondshine et al. | 340/636.1 |
| 6,421,235 | B2 | * | 7/2002 | Ditzik | 361/683 |
| 6,424,123 | B1 | * | 7/2002 | Odaohhara et al. | 320/134 |
| 6,470,290 | B1 | * | 10/2002 | Lee et al. | 702/132 |
| 6,480,964 | B1 | * | 11/2002 | Oh | 713/310 |
| 6,618,681 | B2 | * | 9/2003 | Hoenig et al. | 702/63 |
| 6,691,049 | B1 | * | 2/2004 | Jeansonne et al. | 702/63 |
| 6,741,066 | B1 | * | 5/2004 | Densham et al. | 320/145 |
| 7,000,144 | B2 | * | 2/2006 | Takata | 714/15 |
| 2005/0138437 | A1 | * | 6/2005 | Allen et al. | 713/300 |
| 2006/0208706 | A1 | * | 9/2006 | Hsu et al. | 320/149 |

* cited by examiner

*Primary Examiner*—John E Barlow, Jr.
*Assistant Examiner*—Toan M Le
(74) *Attorney, Agent, or Firm*—Foley & Lardner LLP

(57) ABSTRACT

A method and a system for charging management are applied in an electronic device. The system includes a sensing unit, a detecting unit, a signal output unit, a receiving unit and a processing unit. By the method, when the sensing unit senses an external power source inputted to the electronic device, the detecting unit detects a current electric quantity of a battery of the electronic device. The processing unit actuates the signal output unit to provide an operating interface for a user to issue a command through a hot key or an application program selection control window. After the receiving unit receives the command from the user, a required charging mode is activated according to the user's requirement. Therefore, problems resulted from battery removal such as inconvenience and failure of an uninterruptable power mechanism are solved, and a battery charging frequency is reduced to prolong the battery lifetime.

11 Claims, 4 Drawing Sheets

METHOD AND SYSTEM FOR CHARGING MANAGEMENT

FIELD OF THE INVENTION

The present invention relates to battery charging management techniques, and more particularly, to a method and a system for charging management, which allow a user to decide whether a charging process is to be performed on a battery through the use of keystroke control or an application program selection control window according to an actual electric quantity of the battery, so as to solve problems such as inconvenience and possibility of making an uninterruptable power system fail caused by battery removal.

BACKGROUND OF THE INVENTION

Lately due to progress of the electronic technology, portable electronic devices have been developed rapidly with more and more varieties and functions, and thus become widely popular for consumers. The portability of electronic devices primarily attributes to maturation of the battery technique.

For a present-day laptop computer, as shown in FIG. 1 illustrating a conventional charging technique, when an AC (alternating current) adapter is used to input an alternating current to the laptop computer, the laptop computer enters a charging mode instantly without producing any notice message. However, when the AC adapter inputs the alternating current to the laptop computer, if a user does not wish the laptop computer to be charged by the alternating current in order to reduce unnecessary times of charging and prolong the battery lifetime, it is usually to remove the battery from the laptop computer to prevent charging.

However, the above battery removal method causes significant inconveniences to the user. For example, frequent battery removal may easily result in damage to a battery base and contact terminals, and failure of an uninterruptable power mechanism. Furthermore, due to alteration in weight distribution of the laptop computer, lifting a laptop cover is no longer an effortlessness task, and a portion of a laptop support base is provided on a battery cover in a current design of many laptop computers, such that the battery removal would cause infirm support of the laptop base and inconvenient operation for the user.

Accordingly, some manufacturers have tried to overcome the drawbacks caused by the above conventional technology. A solution is to provide a control circuit for detecting an electric quantity of the laptop battery so as to charge the battery when the electric quantity is below a certain preset value; on the other hand, the battery would not be charged if the electric quantity is above the certain preset value. Although such method may effectively reduce a frequency of charging the battery, the preset value is a default value and uneasy to be modified. This makes the charging process not flexible and not able to satisfy the user's timely requirements.

Therefore, the problem to be solved here is to provide a technique for battery charging management, which allows a user to determine whether to charge a battery of a laptop computer according to a practical requirement so as to effectively reduce a frequency of battery insertion/extraction and avoid various inconveniences caused by battery removal.

SUMMARY OF THE INVENTION

In light of the above prior-art drawbacks, a primary objective of the present invention is to provide a method and a system for charging management, which allow a user to determine whether a charging process is to be performed on an electronic device depending on a practical requirement, so as to reduce a frequency of charging and removing a battery of the electronic device, such that the battery lifetime can be prolonged and damage to a battery base and contact terminals can be effectively prevented.

Another objective of the present invention is to provide a method and a system for charging management, so as to solve a problem of failure of an uninterruptable power mechanism of an electronic device caused by battery removal in the conventional technique.

Still another objective of the present invention is to provide a method and a system for charging management, which can solve problems of weight distribution and infirm support of a base of an electronic device without having to prepare a new mold for a battery base of the electronic device.

A further objective of the present invention is to provide a method and a system for charging management, which use a basic input/output system-embedded controller (BIOS-EC) to monitor and control a charging process on a battery of an electronic device, such that the charging process can be managed even in an operation environment without a Windows operating system, thereby achieving great convenience and compatibility.

In accordance with the foregoing and other objectives, the present invention provides a method and a system for charging management, which can be applied in an electronic device to manage a process of charging an electric quantity of a battery of the electronic device, so as to reduce a charging frequency of the battery and effectively prolong the battery lifetime.

The system for charging management in the present invention comprises (1) a sensing unit for determining whether there is an external power source inputted to the electronic device; (2) a detecting unit for detecting a current electric quantity of the battery of the electronic device; (3) a signal output unit for actuating an output of a display screen or a light indicator of the electronic device to allow a user to issue a command through a hot key or an application program selection control window; (4) a receiving unit for receiving the command from the user to actuate associated functional components; and (5) a processing unit for processing and monitoring operating procedures of the whole system.

The method for charging management in the present invention is to execute a charging management process through the use of the aforementioned system for charging management. The method comprises the steps of: (1) when an external power source is inputted to the electronic device, having the system produce an operating indication by outputting an application program selection control window through a display screen of the electronic device or actuating a light indicator, etc., so as to allow a user to determine whether a keystroke battery charging mode is to be activated to perform a charging process on the electronic device, if yes, proceeding to step (2), or if no, proceeding to step (4); (2) having the user determine depending on a practical requirement whether a command of performing the charging process is to be issued through an operating interface such as the application program selection control window or a hot key of the electronic device, etc., if yes, proceeding to step (4), or if no, proceeding to step (3); (3) temporarily not performing the charging process on the battery of the electronic device, and allowing the user to decide whether the charging process is to be performed depending on a remaining electric quantity of the battery, if yes, returning to step (2), or if no, maintaining the electronic device in such non-charging status; and (4) performing the charging process on the battery through the external power source.

By the system and method for charging management in the present invention, when an external power source is inputted to an electronic device, the system would produce an operating instruction by outputting an application program selection control window through a display screen of the electronic device or actuating a light indicator, etc. to allow a user to decide whether a keystroke battery charging mode is to be activated. The application program selection control window also includes a current consuming status of an electric quantity of a battery of the electronic device to serve as reference for the user, such that the user can decide whether a charging process is to be performed according to a practical condition through an input mode such as keystroke control or selection on the control window. In the prior art, with an external power source being inputted, the charging process is automatically performed on the electronic device without generating any notice message to the user; as a result, if the batter of the electronic device has a sufficient electric quantity and needs not be charged, the user must remove the battery to reduce a charging frequency, and this causes inconvenience to the user. On the contrary, the present invention allows the user to flexibly determine whether to instantly perform the charging process, such that the charging frequency is reduced and the battery lifetime is effectively prolonged.

Therefore, the method and system for charging management in the present invention can effectively overcome the drawbacks of the conventional charging management technique, such that the charging process can be performed on the battery of the electronic device depending on a practical requirement to thereby reduce the charging frequency and effectively prolong the battery lifetime.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Preferred embodiments of a method and a system for charging management proposed in the present invention are described in detail as follows with reference to FIGS. 2 to 5. In the preferred embodiments, the method and system for charging management are applied in a laptop computer to implement a charging management mechanism on a battery of the laptop computer. It is to be noted that the present invention is not limited to an application in the laptop computer; particularly, the present invention is suitably applied in any electronic device using a battery as a power source (such as a personal digital assistant (PDA), digital camera, digital video camera, mobile phone, portable television, and so on) to implement a charge management mechanism on the battery of the electronic device.

Figure 1:
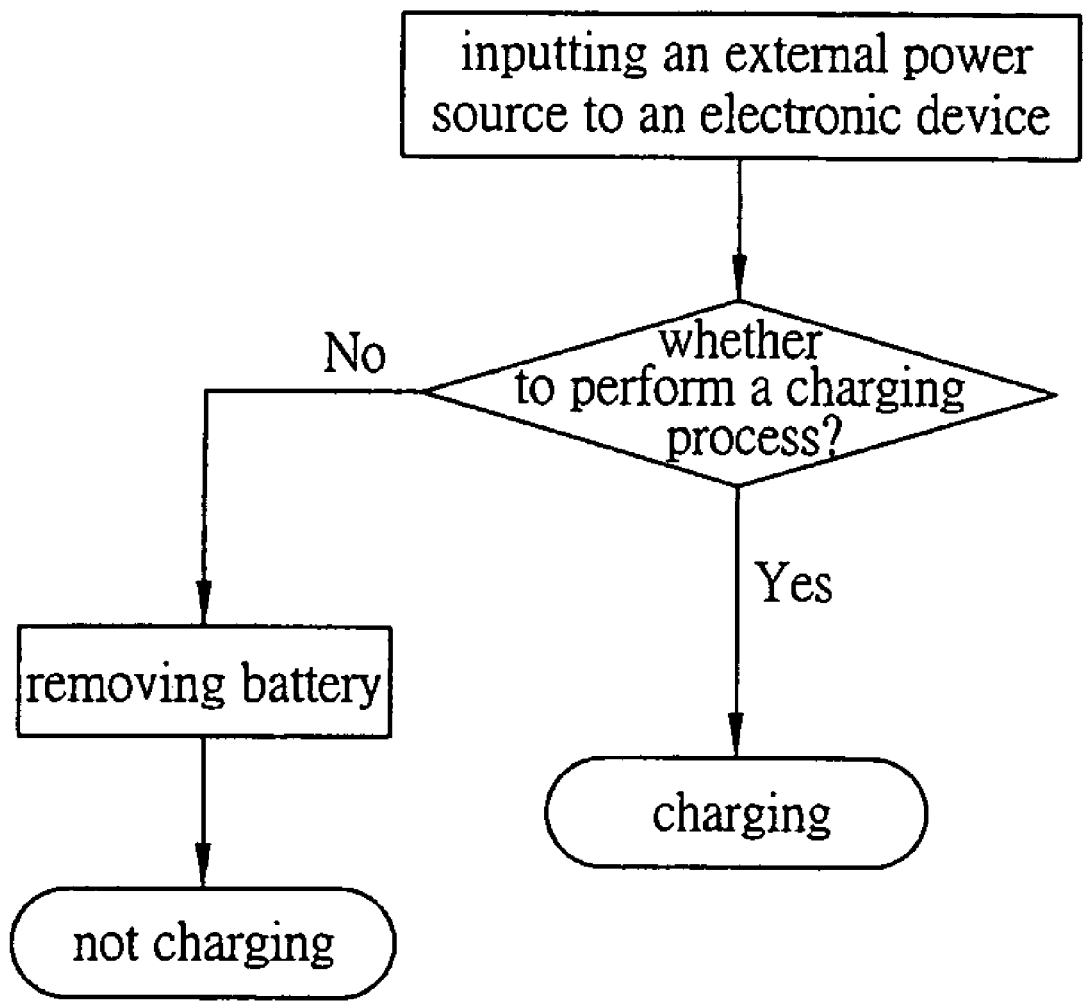
FIG. 1 (PRIOR ART) is a flowchart of a conventional battery charging technique.
Figure 2:
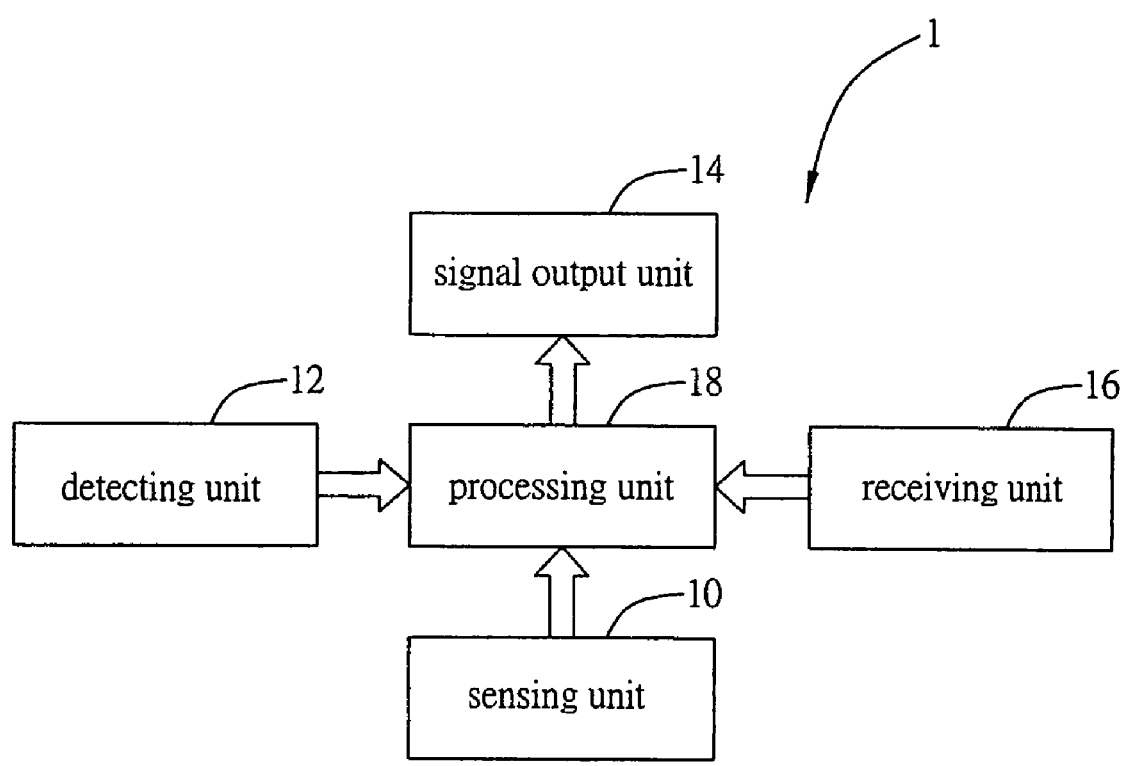
FIG. 2 is a block diagram showing architecture of a system for charging management according to the present invention.

FIG. 2 is a block diagram showing architecture of the system for charging management 1 in the present invention. As shown in FIG. 2, the system 1 comprises a sensing unit 10, a detecting unit 12, a signal output unit 14, a receiving unit 16, and a processing unit 18.

The sensing unit 10 is used to sense whether there is an external power source inputted to the laptop computer (not shown), and send a power source input signal to the processing unit 18 (such as a BIOS-EC) once there is sensed an external power source inputted to the laptop computer. As such, upon receiving the power source input signal, the processing unit 18 actuates the detecting unit 12 to detect a current electric quantity of a battery of the laptop computer and send a detection result back to the processing unit 18. After receiving the detection result, the processing unit 18 actuates the receiving unit 16 to determine whether a user has outputted through a display screen (not shown) of the laptop computer a command to an application program selection control window containing a message of the current electric quantity of the battery or to a hot key. If no, a charging process is performed on the battery of the laptop computer directly through the external power source. If yes, the signal output unit 14 is actuated to output an operating instruction such as the application program selection control window or a light indicator, etc. to ask the user whether to issue a charging command through the application program selection control window or the hot key (not shown) of the laptop computer. If no, the charging process would not be performed on the battery under a condition without removing the battery. If yes, the receiving unit 16 after receiving the charging command from the user sends a feedback signal to the processing unit 18, such that the processing unit 18 can actuate a plurality of functional components that are associated with the charging process to perform the charging process on the battery of the laptop computer.

Figure 3:
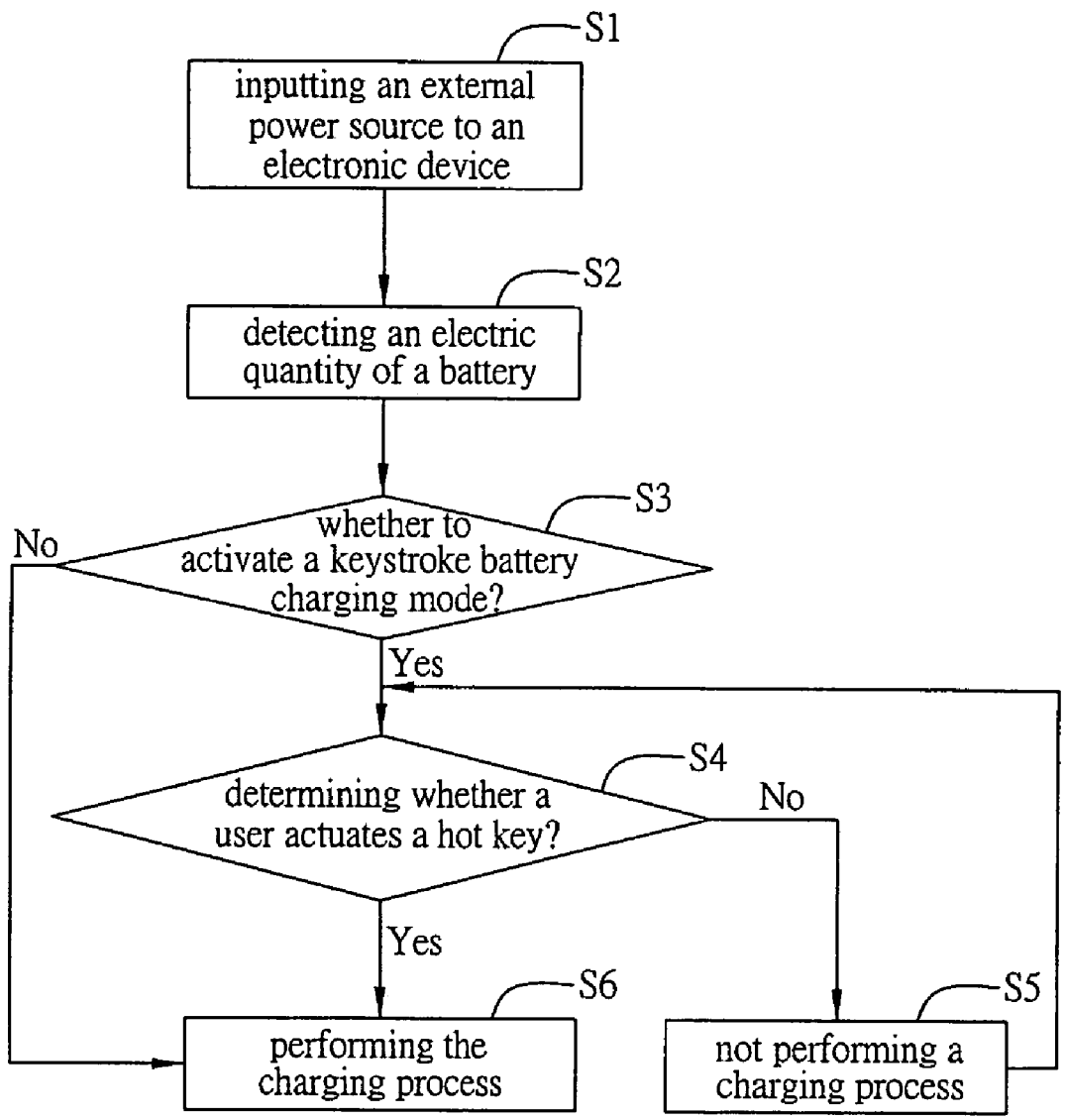
FIG. 3 is a flowchart showing procedural steps of a method for charging management according to the present invention.

FIG. 3 is a flowchart showing procedure steps of the method for charging management according to the present invention. The method in the present invention is to perform a charging management process through the use of the system for charging management 1, and is described in detail as follows with reference to FIGS. 2 and 3. Firstly in step S1, when an external power source is inputted to a laptop computer, the sensing unit 10 senses the external power source and outputs a power source input signal to the processing unit 18. Then, it proceeds to step S2.

In step S2, after the processing unit 18 receives the power source input signal, the detecting unit 12 is actuated to detect a current status of a remaining electric quantity of a battery of the laptop computer and send a detection result back to the processing unit 18. Then, it proceeds to step S3.

In step S3, the processing unit 18 transmits the above detection result to the signal output unit 14, such that the signal output unit 14 is actuated to output through a display screen of the laptop computer an application program selection control window containing a message of the current electric quantity of the battery or actuate a light indicator, so as to allow a user to determine whether a keystroke battery charging mode is to be activated according to a current status. If the keystroke battery charging mode is to be activated, then it proceeds to step S4; or otherwise, it proceeds to step S6.

In step S4, the receiving unit 16 is actuated to detect and determine whether the user has issued a charging command through the application program selection control window or a hot key (not shown) of the laptop computer. If no, then it proceeds to step S5; or if yes, it proceeds to step S6.

In step S5, the processing unit 18 does not actuate functional components to perform a charging process on the battery under a condition without removing the battery of the laptop computer. During such period, the processing unit 18 also actuates the detecting unit 12 to detect a usage status of the electric quantity of the battery according to a time schedule set by the user, and allow the user to return to step S3 and perform the charging process under a condition having an insufficient electric quantity of the battery.

In step S6, the processing unit 18 actuates the functional components associated with the charging process to perform the charging process on the battery of the laptop computer through the external power source.

The method and system for charging management in the present invention allow keystroke or application program selection control to cooperate with a basic input/output system-embedded controller (BIOS-EC) to achieve charging management and control, such that the method and system in the present invention are not limited to an application in a Windows operating system but is also applicable to a non-Windows operating system. For the sake of clear description, hereinafter, each operating system is categorized into an icon-interface characterized Microsoft Windows operating system or a command-interface characterized non-Microsoft Windows operating system.

Figure 4:
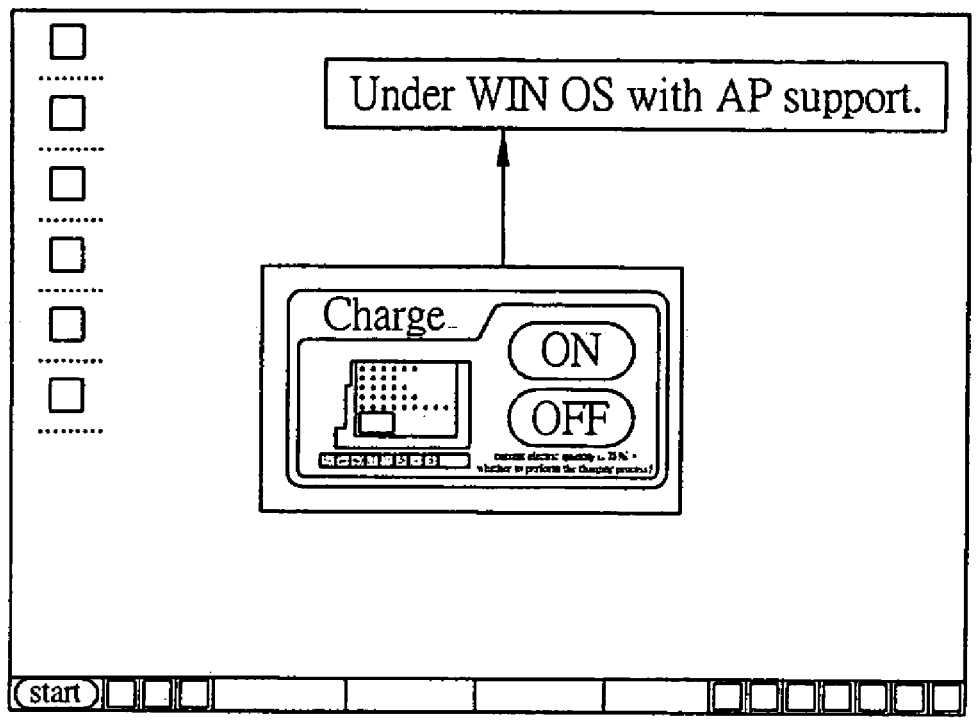
FIG. 4 is a schematic diagram showing an application program selection control window under a Microsoft Windows operating system.

In the Microsoft Windows operating system, the method and system for charging management in the present invention are realized using an application program selection control window or a hot key. A charging management operating interface provided by the present invention is an application program selection control window, as shown in FIG. 4, comprising two control options including ON option and OFF option for determining whether to perform the charging process on the battery; and an indicating column for indicating the current electric quantity of the battery detected by the detecting unit 12 to provide reference for the user to determinate whether to perform the charging process under the keystroke battery charging mode. If yes, then the user can issue a charging command via the hot key to the system for charging management.

Figure 5:
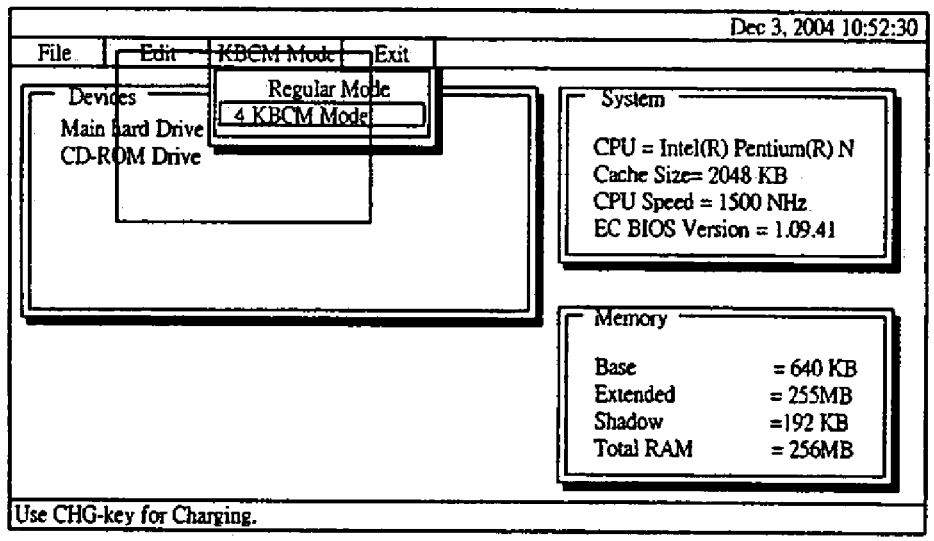
FIG. 5 is a schematic diagram showing an operation window of battery charging management under a non-Microsoft Windows operating system.

In the non-Microsoft Windows operating system, the method and system for charging management in the present invention allow a system configuration utility (SCU) program to cooperate with a hot key to achieve a charging management mechanism. As shown in FIG. 5, a charging mode operating window provided by the present invention is in a command form. Firstly, the display screen outputs a line of indicating message to inform the user about the current electric quantity of the battery detected by the detecting unit 12, and subsequently, a line of commanding message is shown for the user to determine whether to perform the charging process on the battery. If yes, then the user can issue a charging command via the hot key to the system for charging management.

By the above method and system for charging management, the drawbacks of the conventional charging management technique can be effectively overcome to provide convenience in operation for the user, and thus the frequency of charging the battery is reduced dramatically to prolong the battery lifetime, as well as failure of an uninterruptable power mechanism can be prevented.

The invention has been described using exemplary preferred embodiments. However, it is to be understood that the scope of the invention is not limited to the disclosed embodiments. On the contrary, it is intended to cover various modifications and similar arrangement. The scope of the claims therefore should be accorded the broadest interpretation so as to encompass all such modifications and similar arrangements.

What is claimed is:

1. A method for charging management, applicable in an electronic device having a display screen and an input interface, so as to perform a charging process on the electronic device via a system for charging management, the method comprising the steps of:
   (1) having the system display an application program selection control window on the display screen when an external power source is inputted to the electronic device, so as to allow a user to determine whether a keystroke battery charging mode is to be activated to perform the charging process on the electronic device, if yes, proceeding to step (2), or if no, proceeding to step (4);
   (2) having the application program selection control window determine whether an instruction for performing the charging process is received or having the input interface of the electronic device determine whether the instruction for performing the charging process is received, if yes, proceeding to step (4), or if no, proceeding to step (3);
   (3) having the system temporarily subject a battery of the electronic device to a non-charging status, and allowing the user to return to step (2) and determine whether the charging process is to be performed depending on a remaining status of an electric quantity of the battery, if yes, proceeding to step (4), or if no, maintaining the electronic device in the non-charging status; and
   (4) performing the charging process on the battery of the electronic device via the external power source.

2. The method of claim 1, wherein the electronic device is one selected from of the group consisting of laptop computer, personal digital assistant (PDA), digital camera, digital video camera, mobile phone and portable television.

3. The method of claim 1, wherein the method is applied to a Microsoft Windows operating system.

4. The method of claim 1, wherein the method utilizes a basic input/output system-embedded controller (BIOS-BC) to control the charging process and is applicable to a non-Microsoft Windows operating system.

5. The method of claim 1, wherein the input interface of the electronic device is a hot key.

6. The method of claim 1, wherein the external power source is a public alternating current source.

7. The method of claim 1, wherein the application program selection control window comprises an ON option and an OFF option, allowing the user to click on the ON option to have the charging process be performed, or allowing the user to click on the OFF option to keep the battery in the non-charging status.

8. A system for charging management, applicable in an electronic device having a display screen and an operating interface, the system comprising:
   a sensing unit for determining whether there is an external power source inputted to the electronic device, if yes, the sensing unit outputting a power source input signal;
   a detecting unit for detecting a current electric quantity of a battery of the electronic device when the detecting unit receives the power source input signal, and for outputting a detection result;

a signal output unit for displaying an application program selection control window comprising the detection result of the electric quantity of the battery on the display screen, so as to allow a user to determine whether a keystroke battery charging mode is to be activated;

a receiving unit for receiving a command inputted from the user to actuate associated functional components; and a processing unit coupled to the sensing unit, the detecting unit, the signal output unit and the receiving unit, for monitoring operating procedures of the system.

9. The system of claim 8, wherein the electronic device is one selected of the group consisting of laptop computer, personal digital assistant (PDA), digital camera, digital video camera, mobile phone and portable television.

10. The system of claim 8, wherein the processing unit is a basic input/output system-embedded controller (BIOS-EC).

11. The system of claim 8, wherein the receiving unit is adapted to receive a charging command issued from the user through a dialogue window or the operating interface.

\* \* \* \* \*